(12) United States Patent
Kano et al.

(10) Patent No.: US 10,727,709 B2
(45) Date of Patent: Jul. 28, 2020

(54) ROTOR OF ROTARY ELECTRICAL MACHINE, ROTARY ELECTRICAL MACHINE, AND VEHICLE

(71) Applicant: Hitachi Automotive Systems, Ltd., Hitachinaka-shi, Ibaraki (JP)

(72) Inventors: Yuji Kano, Hitachinaka (JP); Hiroshi Hamano, Hitachinaka (JP); Takayuki Koizumi, Hitachinaka (JP); Yasuyuki Saito, Hitachinaka (JP); Yousuke Umesaki, Hitachinaka (JP); Seigo Misaki, Hitachinaka (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 316 days.

(21) Appl. No.: 15/756,326

(22) PCT Filed: Jul. 27, 2016

(86) PCT No.: PCT/JP2016/071943
§ 371 (c)(1),
(2) Date: Feb. 28, 2018

(87) PCT Pub. No.: WO2017/038311
PCT Pub. Date: Mar. 9, 2017

(65) Prior Publication Data
US 2018/0248427 A1 Aug. 30, 2018

(30) Foreign Application Priority Data
Sep. 4, 2015 (JP) .................. 2015-174299

(51) Int. Cl.
*H02K 21/12* (2006.01)
*H02K 1/27* (2006.01)
*H02K 29/03* (2006.01)

(52) U.S. Cl.
CPC ............. *H02K 1/2766* (2013.01); *H02K 1/27* (2013.01); *H02K 29/03* (2013.01); *H02K 2213/03* (2013.01)

(58) Field of Classification Search
CPC .. H02K 1/276; H02K 1/2766; H02K 2213/03; H02K 29/03; H02K 21/021
(Continued)

(56) References Cited

U.S. PATENT DOCUMENTS 8,008,825 B2 *  8/2011  Suzuki ................. H02K 1/2766
                                                310/156.53
8,884,485 B2 * 11/2014  Jurkovic ............. H02K 1/2766
                                                310/156.47
(Continued)

FOREIGN PATENT DOCUMENTS

JP  2011-101504 A   5/2011
JP  2013-128405 A   6/2013
(Continued)

OTHER PUBLICATIONS

International Search Report with English translation and Written Opinion issued in corresponding application No. PCT/JP2016/071943 dated Oct. 25, 2016.
(Continued)

*Primary Examiner* — Thanh Lam
(74) *Attorney, Agent, or Firm* — Foley & Lardner LLP

(57) ABSTRACT

Provided are a rotor of a rotary electrical machine, a rotary electrical machine, and a vehicle, which enable mitigation of stress concentration generated in a magnet insertion hole of a rotor core and high-speed rotation. A rotor 250 of a rotary electrical machine includes: a rotor core 252 including a plurality of magnet insertion holes 253 for each magnetic pole; and permanent magnets 254 inserted into the magnet insertion holes, in which a bridge portion 260, which
(Continued)

mechanically connects a rotor core portion 256 on the outer circumferential side of the magnet insertion holes 253 and a rotor core portion 263 on the inner circumferential side of the magnet insertion holes 253, is provided between the adjacent magnet insertion holes, and the bridge portion 260 has two inflection points 266*a* and 266*b* on the outer circumferential side of the bridge portion 260.

9 Claims, 7 Drawing Sheets

(58) Field of Classification Search
USPC .................................. 310/156.53–156.57
See application file for complete search history.

(56) References Cited

U.S. PATENT DOCUMENTS

| | | | | |
|---|---|---|---|---|
| 8,896,175 B2* | 11/2014 | Cirani | ................ | H02K 1/2766 310/156.08 |
| 8,901,796 B2* | 12/2014 | Matsushita | .............. | H02K 1/28 310/156.09 |
| 10,396,609 B2* | 8/2019 | Mae | .................. | H02K 29/03 |
| 2012/0274169 A1 | 11/2012 | Saito et al. | | |
| 2013/0119817 A1 | 5/2013 | Arimatsu et al. | | |
| 2014/0077653 A1* | 3/2014 | Takahashi | ............ | H02K 1/2766 310/156.53 |
| 2014/0125184 A1* | 5/2014 | Takahashi | .............. | H02K 1/276 310/156.53 |
| 2015/0137632 A1* | 5/2015 | Takahashi | ................. | H02K 1/28 310/54 |
| 2015/0137650 A1* | 5/2015 | Takahashi | ............ | H02K 1/2766 310/156.56 |

FOREIGN PATENT DOCUMENTS

| | | |
|---|---|---|
| JP | 2014-060835 A | 4/2014 |
| JP | 2014-075882 A | 4/2014 |

OTHER PUBLICATIONS

Office Action issued in corresponding Japanese Patent Application No. 2017-537654 dated May 12, 2020, with English machine translation.

* cited by examiner

ROTOR OF ROTARY ELECTRICAL MACHINE, ROTARY ELECTRICAL MACHINE, AND VEHICLE

TECHNICAL FIELD

The present invention relates to a rotor of a rotary electrical machine, a rotary electrical machine, and a vehicle.

BACKGROUND ART

For a rotary electrical machine used for driving a vehicle, high-speed rotation is demanded as compared with ordinary rotary electrical machines. To enable the high-speed rotation, it is necessary to improve the mechanical strength against the centrifugal force of a rotor. For example, a structure of a permanent magnet type rotary electrical machine which enables both high output and mechanical high-speed rotation is described in PTL 1.

CITATION LIST

Patent Literature

PTL 1: JP 2011-101504 A

SUMMARY OF INVENTION

Technical Problem

To cope with further high-speed rotation, mechanical strength improvement against the centrifugal force of a rotor is demanded.

Therefore, it is an object of the present invention to provide a rotor of a rotary electrical machine, a rotary electrical machine, and a vehicle, which enable mitigation of stress concentration generated in a magnet insertion hole of a rotor core and high-speed rotation.

Solution to Problem

To solve the above problem, for example, the configurations described in the claims are adopted.

This application includes a plurality of means for solving the above problem. For example, one example thereof is a rotor of a rotary electrical machine which includes: a rotor core including a plurality of magnet insertion holes for each magnetic pole; and permanent magnets inserted into the magnet insertion holes, in which a bridge portion, which mechanically connects a rotor core portion on the outer circumferential side of the magnet insertion holes and a rotor core portion on the inner circumferential side of the magnet insertion holes, is provided between the adjacent magnet insertion holes, and the bridge portion has two inflection points on the outer circumferential side of the bridge portion.

Advantageous Effects of Invention

According to the present invention, it is possible to provide a rotor of a rotary electrical machine, a rotary electrical machine, and a vehicle, which enable mitigation of stress concentration generated in a magnet insertion hole of a rotor core and high-speed rotation.

Problems, constitutions and effects other than those mentioned above will be apparent by the following description of the examples.

DESCRIPTION OF EMBODIMENTS

Hereinafter, the examples of the present invention will be described with reference to the drawings.

In this example, as will be described below, it is possible to reduce the stress generated in a relief portion of a magnet insertion hole of a rotor core and to increase the rotation speed. Therefore, it is suitable as, for example, a motor of running an electric automobile. A rotary electrical machine according to the present invention can also be applied to a pure electric automobile which runs by only a rotary electrical machine, and a hybrid electric automobile which is driven by both an engine and a rotary electrical machine. Hereinafter, the hybrid electric automobile will be described as an example.

Figure 1:
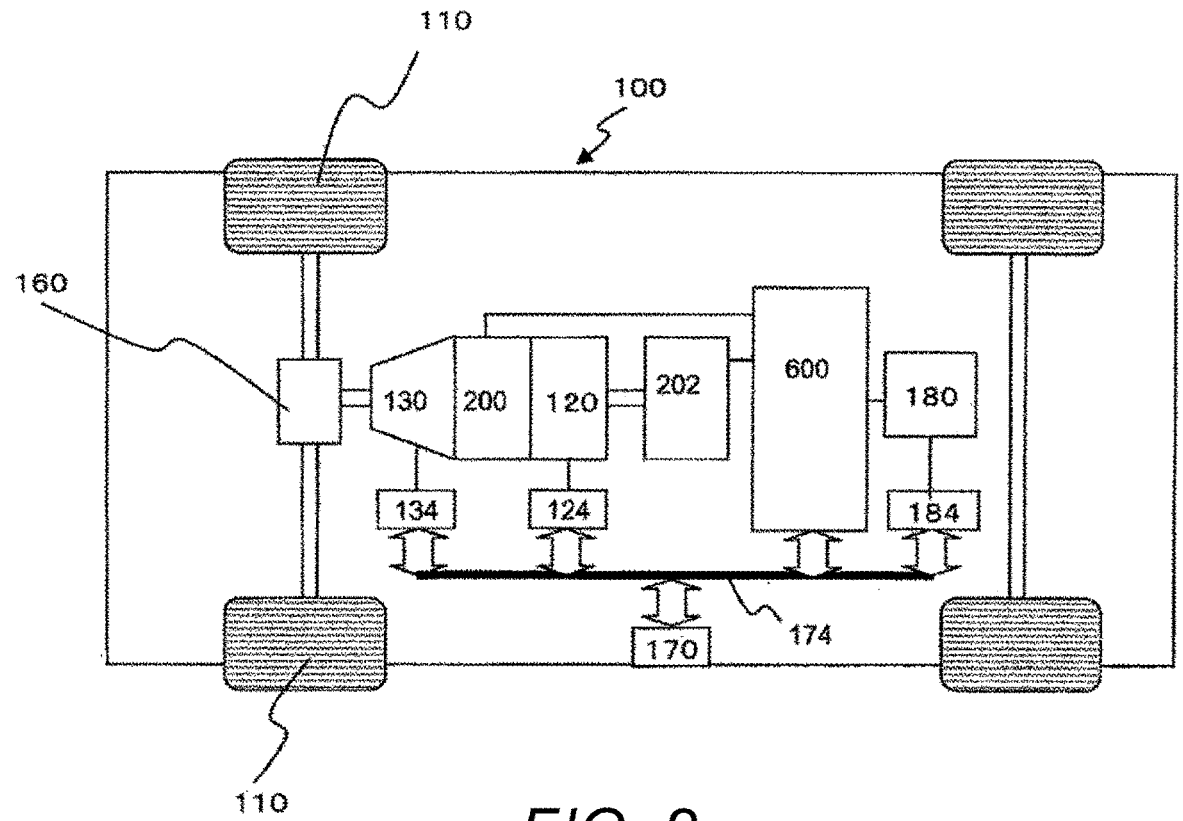
FIG. 1 is a schematic constitution diagram of a hybrid electric automobile in which a rotary electrical machine is mounted.

FIG. 1 is a schematic constitution diagram of a hybrid electric automobile in which a rotary electrical machine is mounted according to one example of the present invention. In a vehicle 100, an engine 120, a first rotary electrical machine 200, a second rotary electrical machine 202 and a battery 180 are mounted. The battery 180 supplies direct current power to the rotary electrical machines 200 and 202 and receives direct current power from the rotary electrical machines 200 and 202 upon regenerative running. The supply and the receipt of the direct current power between the battery 180 and the rotary electrical machines 200 and 202 are performed through a power conversion device 600. Moreover, although not shown, a battery for supplying low voltage power (e.g., 14-volt system power) is mounted in the vehicle and supplies direct current power to a control circuit described later.

The rotary torque by the engine 120 and the rotary electrical machines 200 and 202 is transmitted to front wheels 110 through a transmission 130 and a differential gear 160. The transmission 130 is controlled by a transmission control device 134, and the engine 120 is controlled by an engine control device 124. The battery 180 is controlled by a battery control device 184. The transmission control device 134, the engine control device 184, the power conversion device 600, and an integrated control device 170 are connected by a communication line 174.

The integrated control device 170 is a control device which is superior to the transmission control device 134, the engine control device 124, the power conversion device 600 and the battery control device 184 and receives, through the communication line 174, information on respective states of the transmission control device 134, the engine control device 124, the power conversion device 600 and the battery control device 184 therefrom. The integrated control device 170 calculates a control command for each control device based on the acquired information. The calculated control command is transmitted to each control device through the communication circuit 174.

The high-voltage battery 180 is constituted by a secondary battery such as a lithium ion battery or a nickel-hydrogen battery and outputs high-voltage direct current power of 250 volts to 600 volts or higher. The battery control device 184 outputs a charge/discharge condition of the battery 180 and a state of each unit cell battery constituting the battery 180 to the integrated control device 170 through the communication circuit 174.

When charging of the battery 180 is judged as being necessary based on the information from the battery control device 184, the integrated control device 170 sends a command of power generation operation to the power conversion device 600. Moreover, the integrated control device 170 mainly manages the output torques of the engine 120 and the rotary electrical machines 200 and 202, performs calculation processings of the integrated torque and the torque distribution ratio of the output torque of the engine 120 and the output torques of the rotary electrical machines 200 and 202, and transmits control commands based on the results of the calculation processings to the transmission control device 134, the engine control device 124 and the power conversion device 600. The power conversion device 600 controls the rotary electrical machines 200 and 202 so as to generate a torque output or generated power as required in accordance with the command based on the torque command from the integrated control device 170.

The power conversion device 600 is provided with power semiconductors constituting inverters for operating the rotary electrical machines 200 and 202. The power conversion device 600 controls the switching operation of the power semiconductors based on the command from the integrated control device 170. With this switching operation of the power semiconductors, the rotary electrical machines 200 and 202 are operated as electric motors or power generators.

When the rotary electrical machines 200 and 202 are operated as the electric motors, the direct current power from the high-voltage battery 180 is supplied to direct current terminals of the inverters of the power conversion device 600. The power conversion device 600 controls the switching operation of the power semiconductors to convert the supplied direct current power into three-phase alternating current power and supplies the same to the rotary electrical machines 200 and 202. On the other hand, when the rotary electrical machines 200 and 202 are operated as power generators, rotors of the rotary electrical machines 200 and 202 are rotationally driven by the rotary torque externally applied, and three-phase alternating current power is generated in stator windings of the rotary electrical machines 200 and 202. The generated three-phase alternating current power is converted into direct current power by the power conversion device 600, and this direct current power is supplied to the high-voltage battery 180, thereby charging the battery 180.

Figure 2:
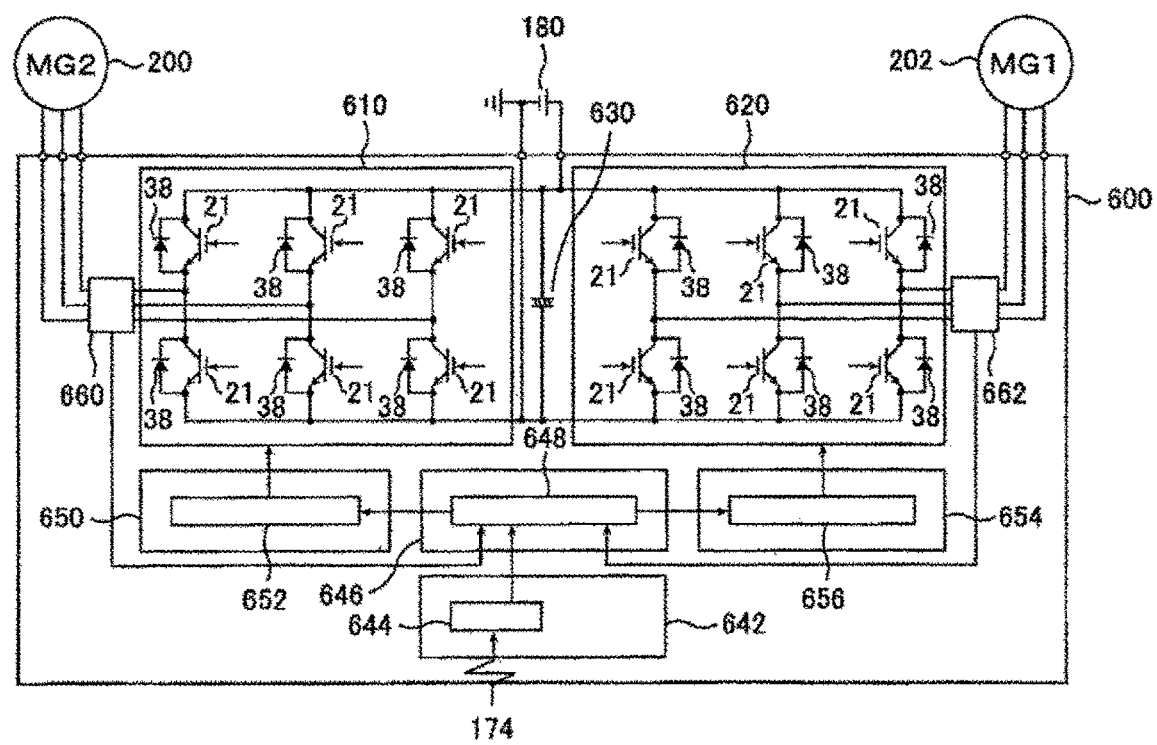
FIG. 2 is a circuit diagram of a power conversion device 600.

FIG. 2 shows a circuit diagram of the power conversion device 600 in FIG. 1. The power conversion device 600 is provided with a first inverter device for the rotary electrical machine 200 and a second inverter device for the rotary electrical machine 202. The first inverter device includes a power module 610, a first drive circuit 652 which controls the switching operation of each power semiconductor 21 of the power module 610, and a current sensor 660 which detects the current of the rotary electrical machine 200. The drive circuit 652 is provided on a drive circuit board 650.

On the other hand, the second inverter device includes a power module 620, a second drive circuit 656 which controls the switching operation of each power semiconductor 21 of the power module 620, and a current sensor 662 which detects the current of the rotary electrical machine 202. The drive circuit 656 is provided on a drive circuit board 654. A control circuit 648 provided on a control circuit board 646, a capacitor module 630, and a transmitter-receiver circuit 644 installed on a connector board 642 are used commonly by the first inverter device and the second inverter device.

The power modules 610 and 620 are operated by driving signals outputted from the corresponding drive circuits 652 and 656, respectively. Each of the power modules 610 and 620 converts the direct current power supplied from the battery 180 into the three-phase alternating current power and supplies this power to the stator windings, which are armature windings of the corresponding rotary electrical machines 200 and 202. The power modules 610 and 620 also convert the alternating current power induced in the stator windings of the rotary electrical machines 200 and 202 into direct currents and supply the same to the high-voltage battery 180.

As shown in FIG. 2, each of the power modules 610 and 620 includes a three-phase bridge circuit, and series circuits corresponding to the three phases are electrically connected in parallel between the positive electrode side and the negative electrode side of the battery 180. Each series circuit includes the power semiconductors 21 constituting an upper arm and the power semiconductors 21 constituting a lower arm, and these power semiconductors 21 are connected in series. The power module 610 and the power module 620 have substantially the same circuit constitutions as shown in FIG. 2, and the power module 610 will be described as a representative herein.

In this embodiment, an insulated gate bipolar transistor (IGBTs) 21 is used as a power semiconductor element for the switching. The IGBT 21 includes three electrodes, a collector electrode, an emitter electrode and a gate electrode. A diode 38 is electrically connected between the collector electrode and the emitter electrode of the IGBT 21. The diode 38 includes two electrodes, a cathode electrode and an anode electrode. The cathode electrode and the anode electrode are electrically connected to the collector electrode of the IGBT 21 and the emitter electrode of the IGBT 21, respectively, so that the direction from the emitter electrode toward the collector electrode of the IGBT 21 becomes a forward direction.

Note that a metal oxide semiconductor field effect transistor (MOSFETs) may also be used as the power semiconductor element for the switching. The MOSFET includes three electrodes, a drain electrode, a source electrode and a gate electrode. Since the MOSFET includes a parasitic diode between the source electrode and the drain electrode so that the direction from the drain electrode toward the source electrode becomes a forward direction, it is unnecessary to provide the diode 38 in FIG. 2.

The arms of each phase are constituted such that the emitter electrode of the IGBT 21 and the collector electrode of the IGBT 21 are electrically connected in series. Note that, although only one IGBT of each of the upper and lower arms of each phase is shown in this embodiment, a plurality of IGBTs are electrically connected in parallel to be constituted in an actual case since the capacity of the controlling current is large. Hereinafter, one power semiconductor will be described to simplify the description.

In the example shown in FIG. 2, each of the upper and lower arms of each phase is constituted by three IGBTs. The collector electrodes of the IGBTs 21 of each upper arm of each phase and the source electrodes of the IGBTs 21 of each lower arm of each phase are electrically connected to the positive electrode side of the battery 180 and the negative electrode side of the battery 180, respectively. The middle points of each arm of each phase (the connection portions of the emitter electrodes of the IGBTs at the upper arm and the collector electrodes of the IGBTs at the lower arm) are electrically connected to the armature windings (stator windings) of the corresponding phases of the corresponding rotary electrical machines 200 and 202.

The drive circuits 652 and 656 constitute drive units for controlling the corresponding inverter devices 610 and 620 and generate driving signals for driving the IGBTs 21 based on the control signals outputted from the control circuit 648. The driving signals generated by the respective drive circuits 652 and 656 are outputted to the gates of each power semiconductor element of the corresponding power modules 610 and 620, respectively. Each of the drive circuits 652 and 656 is provided with six integrated circuits which generate the driving signals supplied to the gates of each of the upper and lower arms of each phase, and these six integrated circuits are constituted as one block.

The control circuit 648 constitutes a control unit of both the inverter devices 610 and 620 and is constituted by a microcomputer which calculates control signals (control values) for operating (turning on/off) the plurality of power semiconductor elements for the switching. To the control circuit 648, the torque command signal (torque command value) from a host control device, the sensor outputs of the current sensors 660 and 662, and the sensor outputs of rotation sensors mounted in the rotary electrical machines 200 and 202 are inputted. The control circuit 648 calculates the control values based on these input signals and outputs the control signals for controlling the switching timings to the drive circuits 652 and 656.

The transmitter-receiver circuit 644 installed on the connector board 642 is for electrically connecting between the power conversion device 600 and an external control device and transmits and receives information to and from other devices through the communication circuit 174 in FIG. 1. The capacitor module 630 constitutes a smoothing circuit for suppressing fluctuation of the direct current voltage generated by the switching operations of the IGBTs 21 and is electrically connected in parallel to the terminals of the first power module 610 and the second power module 620 on the direct current side.

Figure 3:
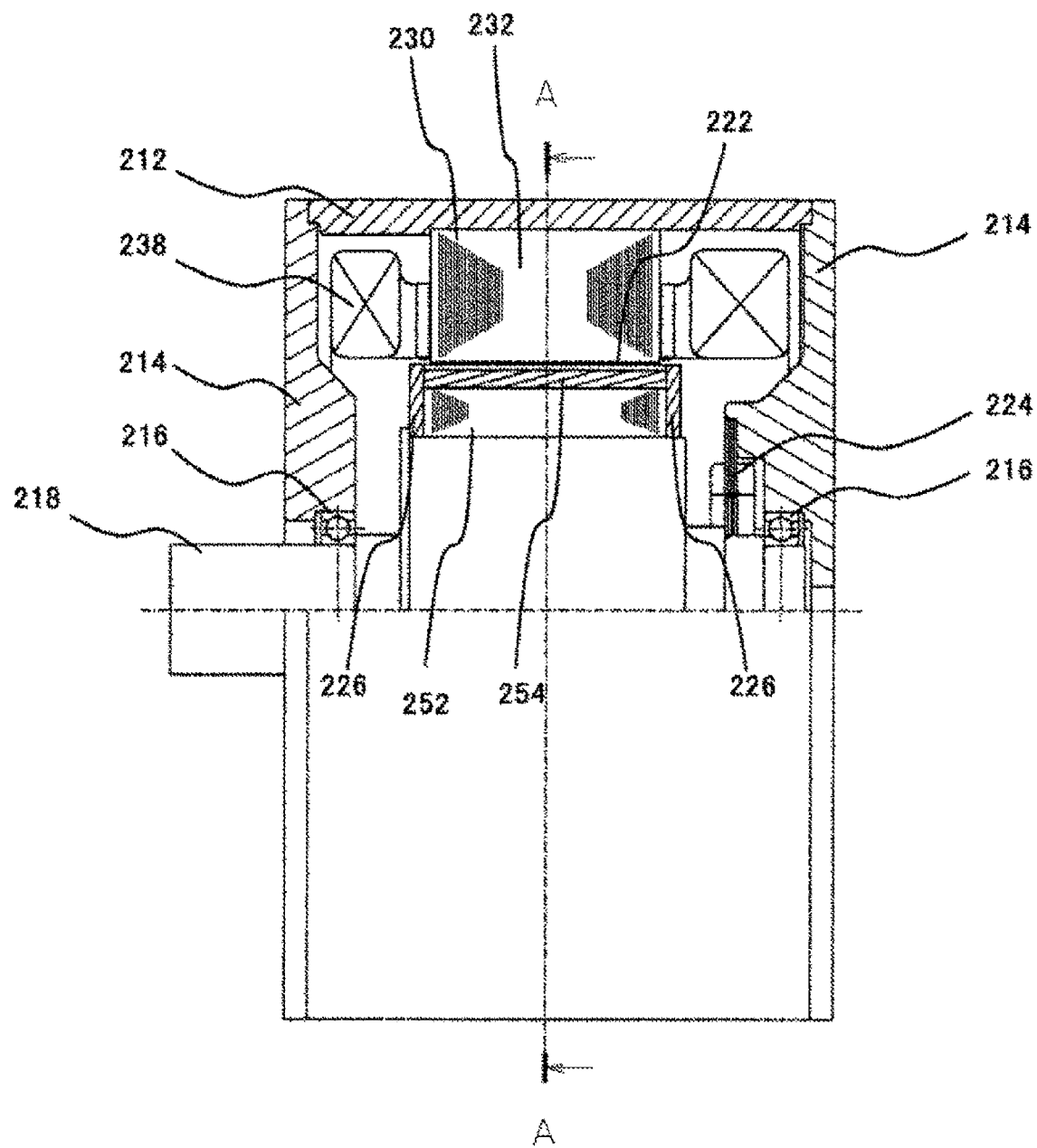
FIG. 3 is a cross-sectional view of the rotary electrical machine.

FIG. 3 is a cross-sectional view of the rotary electrical machines in FIG. 1. Note that the rotary electrical machines 200 and 202 have substantially the same structures. Hereinafter, the structure of the rotary electrical machine 200 will be described as a representative example. However, the structure shown below is not necessarily adopted to both of the rotary electrical machines 200 and 202 and may be adopted to only one of them.

A stator 230 is held inside a housing 212, and the stator 230 includes a stator core 232 and a stator winding 238. At the inner circumferential side of the stator core, a rotor 250 is rotatably held through a gap. The rotor 250 includes a rotor core 252 fixed to a shaft 218, a permanent magnet 254 and nonmagnetic cauls 226. The housing 212 has a pair of end brackets 214 provided with bearings 216, and the shaft 218 is rotatably held by these bearings 216.

The shaft 218 is provided with a resolver 224 for detecting the position of the poles and the rotational speed of the rotor 250. The output from this resolver 224 is taken into the control circuit 648 shown in FIG. 2. The control circuit 648 outputs a control signal to the drive circuit 652 based on the output taken in. The drive circuit 652 outputs a driving signal based on this control signal to the power module 610. The power module 610 performs a switching operation based on the control signal and converts the direct current power supplied from the battery 180 into the three-phase alternating current power. This three-phase alternating current power is supplied to the stator winding 238 shown in FIG. 3, and a rotating magnetic field is generated in the stator 230. The frequency of the three-phase alternating current is controlled based on the output value of the resolver 224, and the phase of the three-phase alternating current with respect to the rotor 250 is also controlled based on the output value of the resolver 224.

Figure 4:
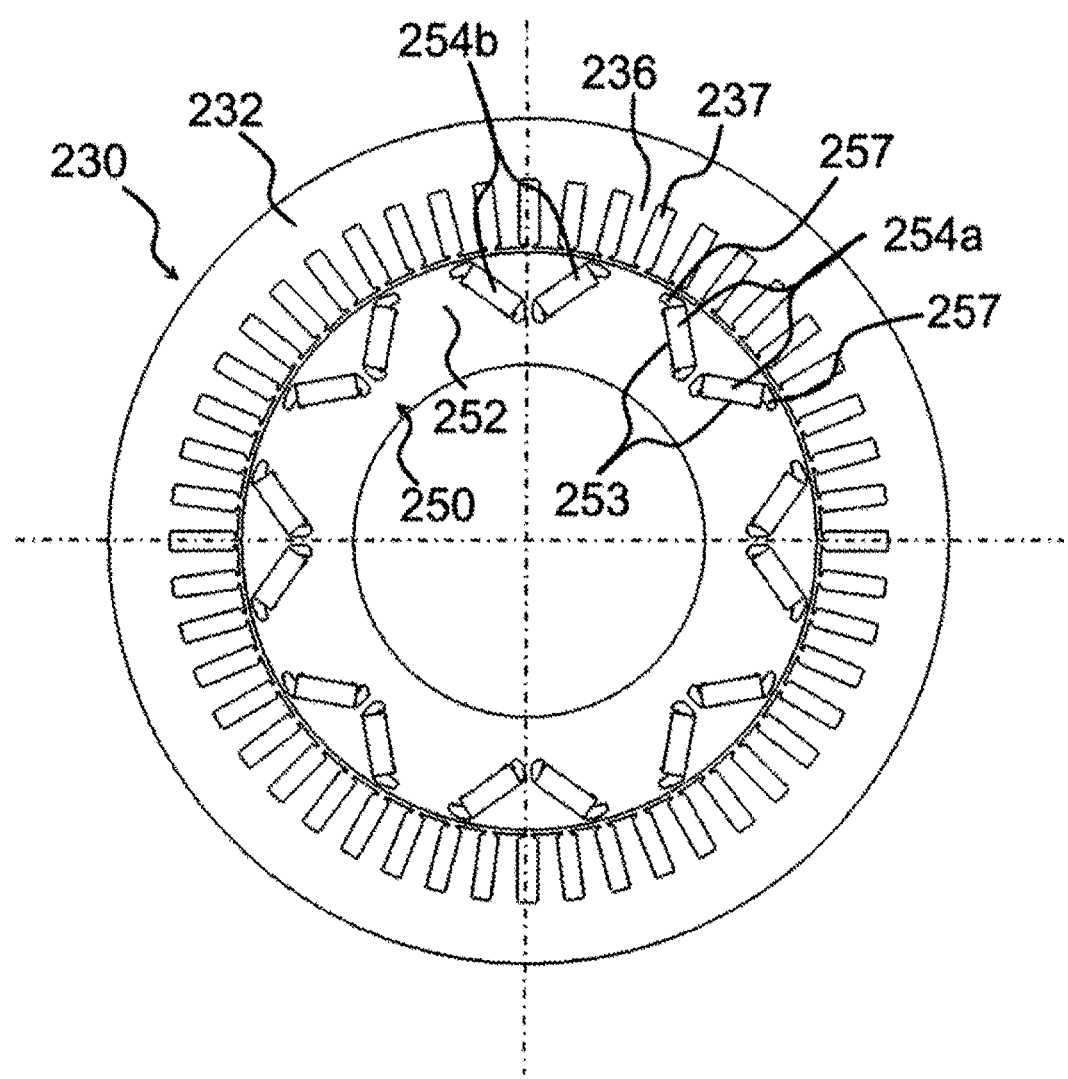
FIG. 4 is a cross-sectional view of a stator 230 and a rotor 250.

FIG. 4 is a view showing cross-sections of the stator 230 and the rotor 250 and shows the AA cross-sectional view of FIG. 3. Note that the description of the housing 212, the shaft 218 and the stator winding 238 is omitted in FIG. 4. A large number of slots 237 and teeth 236 are equally arranged over the entire circumference on the inner circumferential side of the stator core 232. In FIG. 4, not all the slots and teeth are given the reference signs, and only parts of teeth and slots are given the reference signs as representatives. A slot insulating material (not shown) is provided in the slot 237, and a plurality of phase windings of U phase, V phase and W phase constituting the stator winding 238 in FIG. 3 are attached thereto. In this embodiment, 48 slots 237 are formed at regular intervals.

Moreover, in the vicinity of the outer circumference of the rotor core 252, a plurality of (16) magnet insertion holes 253 for inserting rectangular magnets are disposed along the circumferential direction. Each magnet insertion hole 253 is formed along the axial direction, and the permanent magnets 254 (254a and 254b) are embedded in the respective magnet insertion holes 253 and fixed with an adhesive or the like. The width of the magnet insertion holes 253 in the circumferential direction is set to be longer than the width of the permanent magnets 254 in the circumferential direction, and hole spaces 257 outside the magnetic poles of the permanent magnets 254 function as magnetic gaps. These hole spaces 257 may be filled with an adhesive or may be molded integrally with the permanent magnets 254 by molding resin. The permanent magnets 254 act as field poles of the rotor 250 and have eight-pole constitution in this embodiment.

The magnetization direction of the permanent magnets 254 is directed to a direction vertical to the long sides of the permanent magnets, and the orientation of the magnetization direction is reversed for each field pole. That is, if the stator side surfaces and the axial side surfaces of the permanent magnets 254a are N poles and S poles, respectively, the stator side surfaces and the axial side surfaces of the permanent magnets 254b are S poles and N poles, respectively. Furthermore, these permanent magnets 254a and 254b are alternately arranged in the circumferential direction.

The permanent magnets 254 may be inserted into the magnet insertion holes 253 after being magnetized or may be magnetized by applying a strong magnetic field after being inserted into the magnet insertion holes 253 of the rotor core 252. However, the permanent magnets 254 after the magnetization are strong magnets. Thus, if the magnets are magnetized before the permanent magnets 254 are fixed to the rotor 250, cooperative attractive force is generated between the permanent magnets 254 and the rotor core 252 upon the fixation and hinders the assembling work. Moreover, due to the strong attractive force of the permanent magnets 254, there is a risk that dust such as iron powder may adhere to the permanent magnets 254. Therefore, in consideration of the productivity of the rotary electrical machines, it is preferable to perform the magnetization after the permanent magnets 254 are inserted into the rotor core 252.

Note that neodymium-based or samarium-based sintered magnet or ferrite magnets, neodymium-based bonded magnets, or the like can be used as the permanent magnets 254. The residual magnetic flux density of the permanent magnets 254 is about 0.4 to 1.4 T.

When a rotating magnetic field is generated in the stator 230 by flowing the three-phase alternating current to the stator winding 238, this rotating magnetic field acts on the permanent magnets 254a and 254b of the rotor 250, thereby generating torque. This torque is expressed by the product of the component, which is interlinked to each phase winding, of the magnetic flux emitted from the permanent magnets 254 and the component, which is orthogonal to the inter-linkage magnetic flux, of the alternating current flowing in each phase winding. Herein, when the alternating current waveform is considered to have a sinusoidal shape, the product of the fundamental wave component of the inter-linkage magnetic flux and the fundamental wave component of the alternating current becomes a time-averaged component of the torque, and the product of the harmonic component of the interlinkage magnetic flux and the fundamental wave component of the alternating current becomes a torque ripple, the harmonic component of the torque. That is, to reduce the torque ripple, the harmonic component of the interlinkage magnetic flux should be reduced. In other words, since the product of the interlinkage magnetic flux and the angular acceleration of the rotation of the rotor is an induced voltage, reducing the harmonic component of the interlinkage magnetic flux is substantially the same as reducing the harmonic component of the induced voltage.

Figure 5:
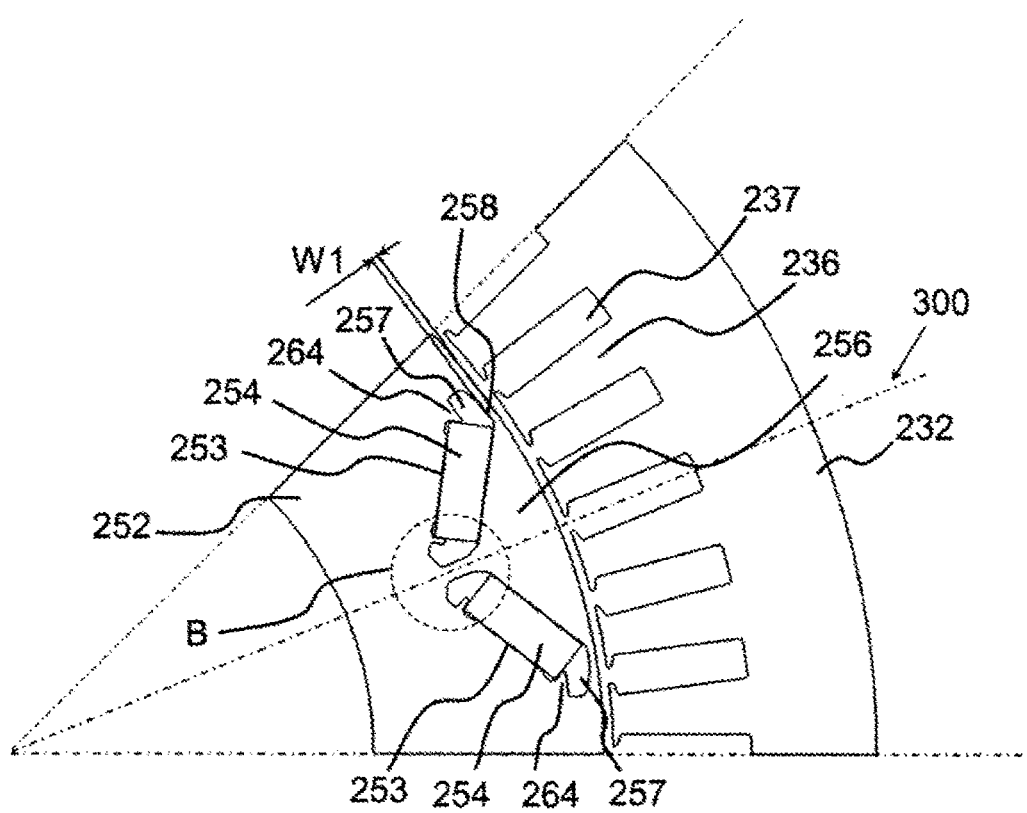
FIG. 5 is an enlarged view of the stator 230 and the rotor 250 for one magnetic pole.

FIG. 5 is an enlarged view of the cross-sectional view shown in FIG. 4 for one magnetic pole. The magnet insertion holes 253 provided in the rotor core 252 have symmetrical shapes with respect to a d axis 300, the center of the one pole. Magnetic gaps 257 are formed outside the magnetic poles of the permanent magnets 254 and provided to reduce cogging torque and torque pulsation upon conduction. Moreover, a thickness of the magnetic gaps 257 in the radial direction is shorter than a thickness of the permanent magnets 254 in the radial direction, and magnetic pole end pressing portions 264, which are portions of the rotor core on the inner circumferential side of the magnetic gaps 257, regulate the movement of the permanent magnets 254 toward the circumferential direction. Furthermore, a core 256 existing between the holes 253, into which the permanent magnets 254 are inserted, and the outer circumference of the rotor core 252 is set such that a width W1 of a magnetic pole end bridge portion 258 becomes the thinnest in the radial dimension. When the width W1 of the magnetic pole end bridge portion 258 is shortened, the magnetic flux flowing in the magnetic path in the rotor from the permanent magnets decreases and more magnetic flux reaches the stator side so that the magnet torque can be increased. Therefore, it is preferable that the width W1 of the magnetic pole end bridge portion 258 be made as short as possible to the extent that the stress when the rotor rotates can be tolerated.

Figure 6:
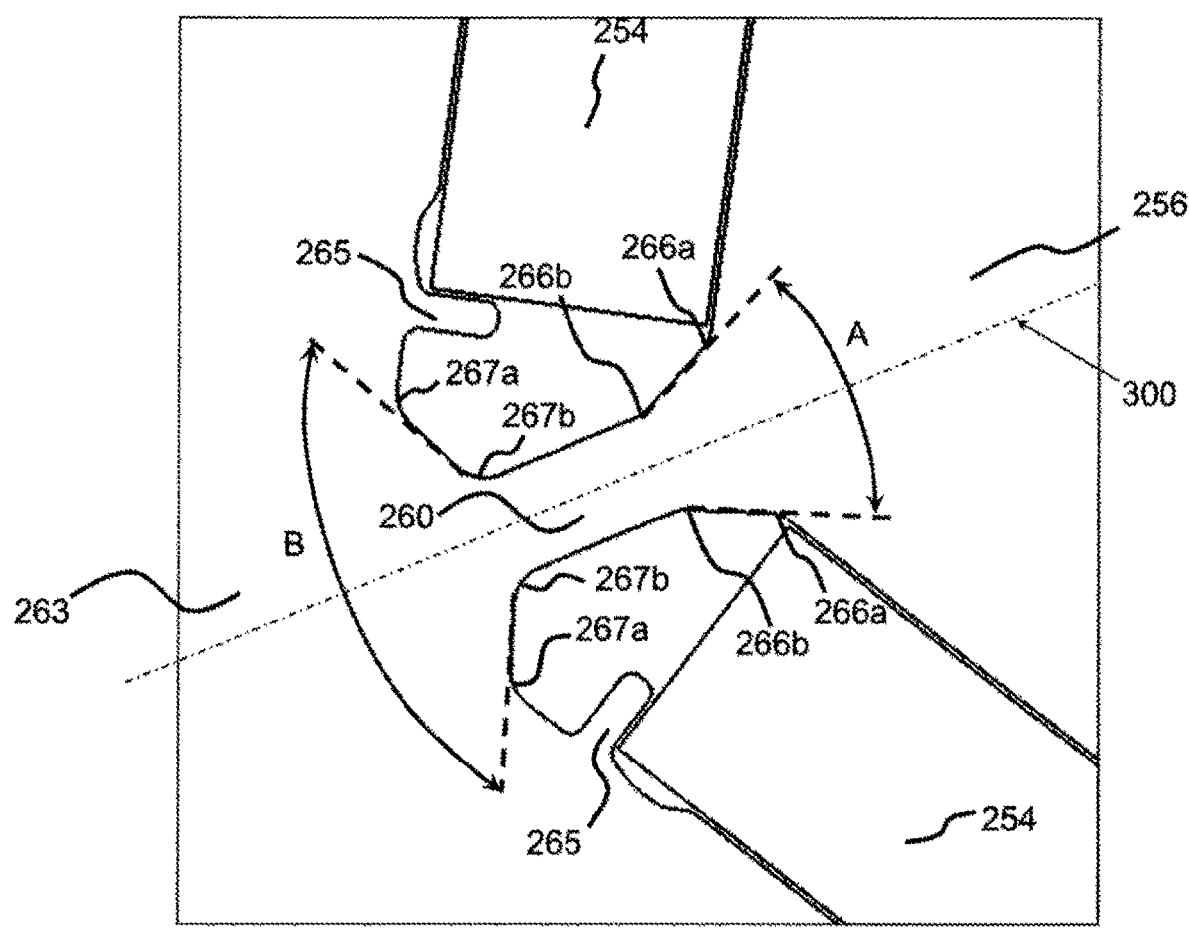
FIG. 6 is an enlarged view of the vicinity of an inter-magnet bridge portion 260 of a rotor core in FIG. 5.
Figure 7:
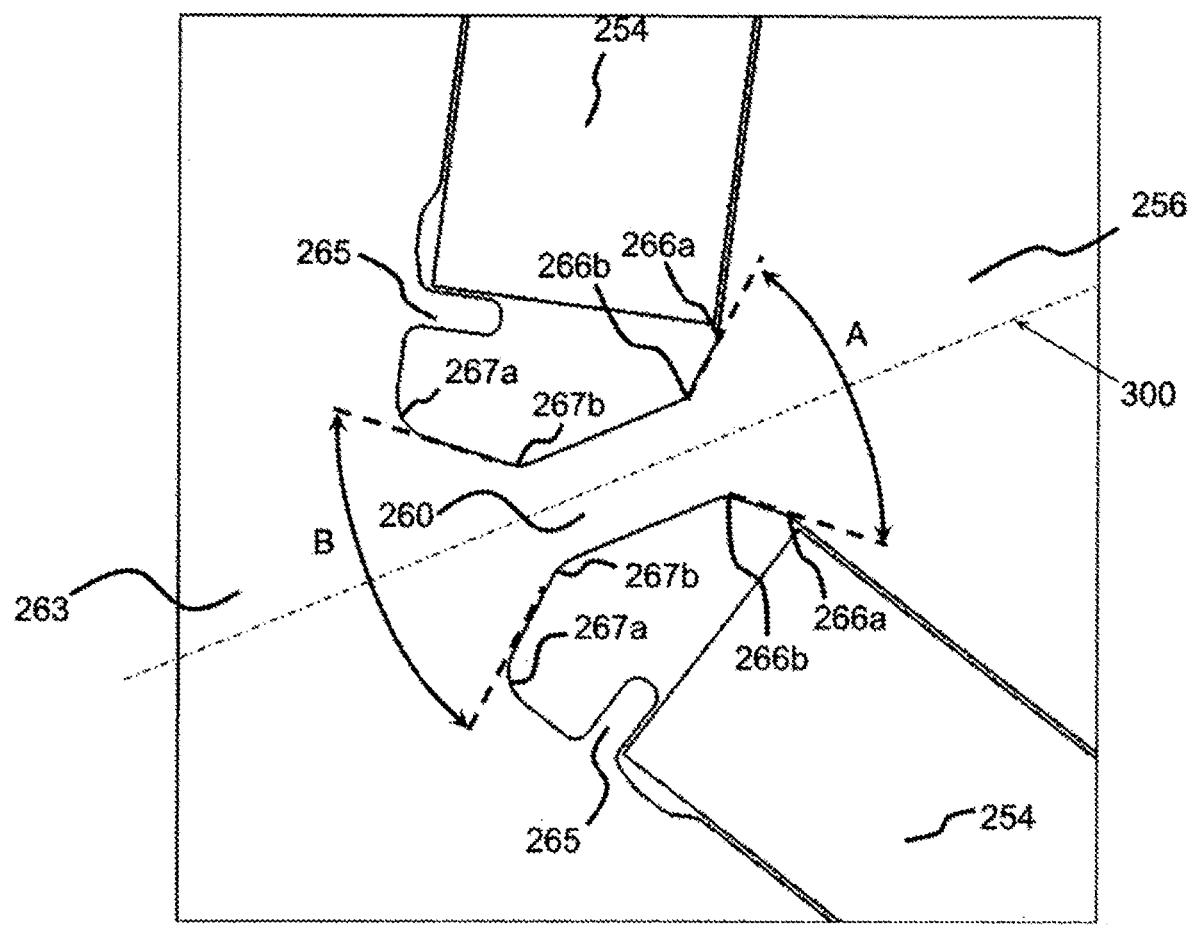
FIG. 7 is an enlarged view of the vicinity of the inter-magnet bridge portion 260 of the rotor core (another example).
Figure 8:
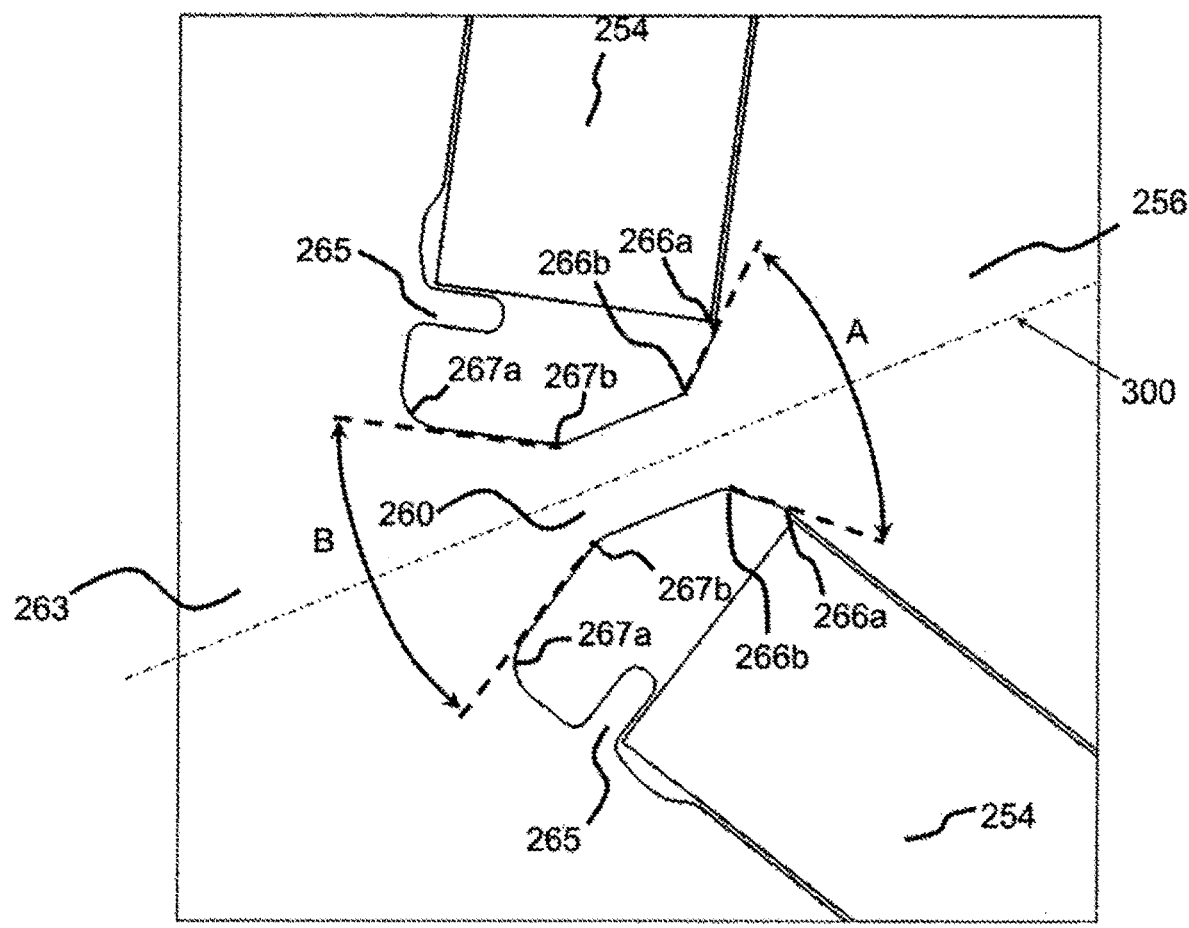
FIG. 8 is an enlarged view of the vicinity of the inter-magnet bridge portion 260 of the rotor core (still another example).

FIG. 6 is an enlarged view of an inter-magnet bridge portion 260 (region indicated by B) of the rotor core shown in FIG. 5. The inter-magnet bridge portion 260 is provided between the pair of permanent magnets 254 so as to mechanically connect a magnetic pole outer side portion 256 of the rotor core on the outer circumferential side of the permanent magnets 254 and a magnetic pole inner side portion 263 of the rotor core on the inner circumferential side. Moreover, to regulate the movement of the permanent magnets 254 toward the circumferential direction, magnetic pole pressing portions 265 are provided on the inner circumferential side in the vicinity of the bridge portion for the permanent magnets. The inter-magnet bridge portion 260 has two outer circumferential side inflection points 266a and 266b each at the outer circumferential side of the rotor core, which are bilaterally symmetrical with respect to the d axis 300, and has two inner circumferential side inflection points 267a and 267b each at the inner circumferential side, which are bilaterally symmetrical with respect to the d axis 300. The shape of the inter-magnet bridge is a shape in which the outer circumferential side inflection points 266a and 266b, the outer circumferential side inflection point 266b and the inner circumferential side inflection point 267b, and the inner circumferential side inflection points 267b and 267a are each connected by a straight line. These outer circumferential side inflection points 266a and 266b and inner circumferential side inflection points 267a and 267b cannot be corners due to the manufacture of the rotor core, and corners R are provided. These corners Rare also included as inflection points. In this embodiment, the inflection points are connected to each other by straight lines, but may be by boundary lines with long curvature radii. An angle A, which is formed by the straight line connecting the outer circumferential side inflection points 266a and 266b, and an angle B, which is formed by the straight line connecting the inner circumferential side inflection points 267a and 267b, are in the relationship of the angle A< the angle B. The shape of the bridge shown in FIGS. 5 and 6 has the relationship of the angle A< the angle B, but the relationship may be the angle A=the angle B as shown in FIG. 7 or the angle A> the angle B as shown in FIG. 8. By thus providing the plurality of inflection points and adjusting the angle A and the angle B according to the degree of the stress generated at each inflection point, it is possible to avoid stress concentration at one inflection point and increase the rotation speed.

Note that the present invention is not limited to the above examples and includes various modifications. For example, the detailed description of the above examples has been made so that the present invention can be easily understood, and the present invention is not necessarily limited to those including all the constitutions which have been described. Moreover, addition, deletion and replacement of other constitutions can be made to a part of the constitution of each example.

REFERENCE SIGNS LIST 250 rotor
252 rotor core
253 magnet insertion hole
254 permanent magnet
256 magnetic pole outer side portion of rotor core
260 inter-magnet bridge portion
263 magnetic pole inner side portion of rotor core
265 magnetic pole pressing portion 266a, 266b outer circumferential side inflection point
267b, 267a inner circumferential side inflection point
300 d axis A angle formed by straight line connecting outer circumferential side inflection points 266a and 266b B angle formed by straight line connecting inner circumferential side inflection points 267a and 267b

The invention claimed is:

1. A rotor of a rotary electrical machine, comprising:
   a rotor core comprising a plurality of magnet insertion holes for each magnetic pole; and
   permanent magnets inserted into the magnet insertion holes,
   wherein a bridge portion, which mechanically connects a rotor core portion on an outer circumferential side of the magnet insertion holes and a rotor core portion on an inner circumferential side of the magnet insertion holes, is provided between the magnet insertion holes which are adjacent, and
   the bridge portion includes two inflection points on an outer circumferential side of the bridge portion.

2. The rotor of a rotary electrical machine according to claim 1,
   wherein the bridge portion has a side or an arc, which connects the two inflection points, between the two inflection points on the outer circumferential side.

3. The rotor of a rotary electrical machine according to claim 1,
   wherein the bridge portion has two inflection points on an inner circumferential side of the bridge portion.

4. The rotor of a rotary electrical machine according to claim 3,
   wherein the bridge portion has a side or an arc, which connects the two inflection points, between the two inflection points on the inner circumferential side.

5. The rotor of a rotary electrical machine according to claim 3,
   wherein an angle formed by an oblique side portion connecting the two inflection points on the inner circumferential side is greater than an angle formed by an oblique side portion connecting the two inflection points on the outer circumferential side.

6. The rotor of a rotary electrical machine according to claim 3,
   wherein an angle formed by an oblique side portion connecting the two inflection points on the outer circumferential side is greater than an angle formed by an oblique side portion connecting the two inflection points on the inner circumferential side.

7. The rotor of a rotary electrical machine according to claim 3,
   wherein an angle formed by an oblique side portion connecting the two inflection points on the outer circumferential side is equal to an angle formed by an oblique side portion connecting the two inflection points on the inner circumferential side.

8. A rotary electrical machine comprising:
   the rotor of a rotary electrical machine according to claim 1; and
   a stator opposing the rotor through a gap.

9. A vehicle comprising the rotary electrical machine according to claim 8,
   wherein the rotary electrical machine is used as a driving force source upon running.

* * * * *